United States Patent
Jordan et al.

(10) Patent No.: US 12,393,698 B2
(45) Date of Patent: Aug. 19, 2025

(54) CODE VULNERABILITY DETECTION AND VALIDATION

(71) Applicant: Oracle International Corporation, Redwood Shores, CA (US)

(72) Inventors: Alexander Jordan, Vienna (AT); Mahinthan Chandramohan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 201 days.

(21) Appl. No.: 18/452,285

(22) Filed: Aug. 18, 2023

(65) Prior Publication Data
US 2025/0061207 A1 Feb. 20, 2025

(51) Int. Cl.
*G06F 21/57* (2013.01)
*G06F 8/71* (2018.01)

(52) U.S. Cl.
CPC .............. *G06F 21/577* (2013.01); *G06F 8/71* (2013.01)

(58) Field of Classification Search
CPC .......... G06F 21/57; G06F 21/577; G06F 8/65; G06F 8/658; G06F 8/71
See application file for complete search history.

(56) References Cited

U.S. PATENT DOCUMENTS

| | | | | |
|---|---|---|---|---|
| 2005/0223268 A1* | 10/2005 | Tchen | ................ | G11C 16/102 714/6.12 |
| 2013/0024854 A1* | 1/2013 | Kumagai | ................ | G06F 8/656 717/174 |
| 2021/0019418 A1* | 1/2021 | Peeters | ................ | H04L 9/3242 |
| 2023/0236827 A1* | 7/2023 | Nemirovsky | ............. | G06F 8/71 717/168 |
| 2023/0273783 A1* | 8/2023 | Molander | ................ | G06F 8/61 717/168 |
| 2024/0045669 A1* | 2/2024 | D'Souza | ................ | G06F 8/71 |

OTHER PUBLICATIONS

Guru Bhandari, Amara Naseer, and Leon Moonen. "CVE_xes: Automated Collection of Vulnerabilities and Their Fixes from Open-Source Software". In: Proceedings of the 17th International Conference on Predictive Models and Data Analytics in Software Engineering. Promise 2021. Athens, Greece: Association for Computing Machinery, 2021, pp. 30-39. isbn: 9781450386807, 10 pages.

(Continued)

*Primary Examiner* — Boris D Grijalva Lobos
(74) *Attorney, Agent, or Firm* — Lathrop GPM LLP

(57) ABSTRACT

A method of code vulnerability detection includes obtaining a set of patches from at least one code repository for a vulnerability record of a vulnerability of a software component, applying the set of patches to obtain a modified set of code files modified by the set of patches, and inferring a vulnerable code section set according to the modified set of code files. The vulnerable code section set is a subset of the modified set of code files. The method further includes obtaining a vulnerable version list of a plurality of versions of the software component comprising the vulnerability, validating a version in the vulnerable version list as having the vulnerable code section set, and processing a target software comprising the version using the vulnerable code section set.

20 Claims, 7 Drawing Sheets

(56) References Cited

OTHER PUBLICATIONS

Quang-Cuong Bui, Riccardo Scandariato, and Nicol_as E D__az Ferreyra. "Vul4J: a dataset of reproducible Java vulnerabilities geared towards the study of program repair techniques". In: Proceedings of the 19th International Conference on Mining Software Repositories. 2022, pp. 464-468., 5 pages.

Dhavleesh Rattan, Rajesh Bhatia, and Maninder Singh. "Software clone detection: A systematic review". In: Information and Software Technology 55.7 (2013), pp. 1165-1199, 35 pages.

Serena Elisa Ponta, Henrik Plate, and Antonino Sabetta. "Detection, assessment and mitigation of vulnerabilities in open source dependencies". In: Empirical Software Engineering 25.5 (2020), pp. 3175-3215, 41 pages.

Guanjun Lin et al. "Software Vulnerability Detection Using Deep Neural Networks: A Survey". In: Proceedings of the IEEE 108.10 (2020), pp. 1825-1848. 24 pages.

\* cited by examiner

CODE VULNERABILITY DETECTION AND VALIDATION

BACKGROUND

Software development often includes developers writing new source code that uses software components. As used herein, software components are computer language instructions that may be used by other software. For example, a software component may be a software library, or service. After creating the source code, the source code may be compiled and linked with the software components to create compiled code that is the executable software. The binary code may be made up of smaller subcomponents such as object files, modules, or classes. At this stage, the compiled code is not easily readable by a human.

For large software projects, many software components and software component versions may be used in a single software project. After software components are released and used on software projects, vulnerabilities may be discovered in the software components. For example, vulnerabilities may be discovered in the software component months or even years after users, of the software component, who are unrelated to the developer of the software component, have integrated the software component into their software projects. A vulnerability is a weakness in the software component that may allow an unauthorized user or code to attack software that uses the software component. Thus, malicious code and users may perform denial of service attacks, install malware, access sensitive data, or perform other nefarious actions by exploiting the vulnerability.

When a vulnerability is detected, the entity (e.g., individual or organization) detecting the vulnerability may report the vulnerability to a centralized repository. Multiple centralized repositories of vulnerabilities may exist. Because entities detecting and reporting vulnerabilities are often third party entities, approximations may exist in indicating which versions of the software component are affected. Similarly, the whole software component may be marked as having the vulnerability.

Because of the granularity at which vulnerabilities are reported, and the possible errors in the reporting, software that uses a software component may be updated regardless of whether the portion of the software component that the software uses has the vulnerability. With the size of the software and the number of software components that may be used, many updates are performed that are not needed.

SUMMARY

In general, in one aspect, one or more embodiments relate to a method that includes obtaining a set of patches from at least one code repository for a vulnerability record of a vulnerability of a software component, applying the set of patches to obtain a modified set of code files modified by the set of patches, and inferring a vulnerable code section set according to the modified set of code files. The vulnerable code section set is a subset of the modified set of code files. The method further includes obtaining a vulnerable version list of a plurality of versions of the software component comprising the vulnerability, validating a version in the vulnerable version list as having the vulnerable code section set, and processing a target software comprising the version using the vulnerable code section set.

In general, in one aspect, one or more embodiments relate to a system that includes a data repository storing a vulnerable code section record and at least one processor for executing instructions for performing operations. The operations include obtaining a set of patches from at least one code repository for a vulnerability record of a vulnerability of a software component, applying the set of patches to obtain a modified set of code files modified by the set of patches, and inferring a vulnerable code section set according to the modified set of code files. The vulnerable code section set is a subset of the modified set of code files. The operations further includes obtaining a vulnerable version list of a plurality of versions of the software component comprising the vulnerability, validating a version in the vulnerable version list as having the vulnerable code section set, and processing a target software comprising the version using the vulnerable code section set.

In general, in one aspect, one or more embodiments relate to a non-transitory computer readable medium comprising computer readable program code for performing operations. The operations include obtaining a set of patches from at least one code repository for a vulnerability record of a vulnerability of a software component, applying the set of patches to obtain a modified set of code files modified by the set of patches, and inferring a vulnerable code section set according to the modified set of code files. The vulnerable code section set is a subset of the modified set of code files. The operations further includes obtaining a vulnerable version list of a plurality of versions of the software component comprising the vulnerability, validating a version in the vulnerable version list as having the vulnerable code section set, and processing a target software comprising the version using the vulnerable code section set.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Vulnerabilities in software components are reported at the granularity level of the software component with a record of versions that are affected. Thus, while the vulnerability may affect a single code section or a few code sections of the software component, target software that uses the software component is assumed to be vulnerable despite which code section(s) are actually used by the target software.

In general, embodiments are directed to determining particular code section(s) of a software component having a vulnerability. Specifically, one or more embodiments apply known patches for the vulnerability on the software component to obtain a modified set of code files of the software component. Then, one or more embodiments compare the modified set of code files to the original corresponding code files of the software component. Based on the comparison, vulnerable code sections are inferred. Thus, rather than having a granularity of identifying the vulnerability being on the basis of the software component, the granularity level is on the basis of the code section.

Additionally, one or more embodiments validate which versions of the software component are vulnerable due to the identified code sections. Specifically, the vulnerability record reporting the versions that are deemed vulnerable may be inaccurate or have undergone changes that do not allow the vulnerable code sections being identified. One or more embodiments determine whether the modified set of code sections are present in the versions that are listed as being vulnerable. If a version includes the modified set of code sections, then the version is validated as being vulnerable due to the identified code sections. Thus, for vulnerable versions, a fine grained analysis is determined.

Using the code section granularity and the version validation, one or more embodiments are able to determine whether target software actually includes a vulnerability. Rather than updating the target software for each vulnerability that affect the software component, target software is only updated when the target software actually includes the code sections that have the vulnerability.

Figure 1:
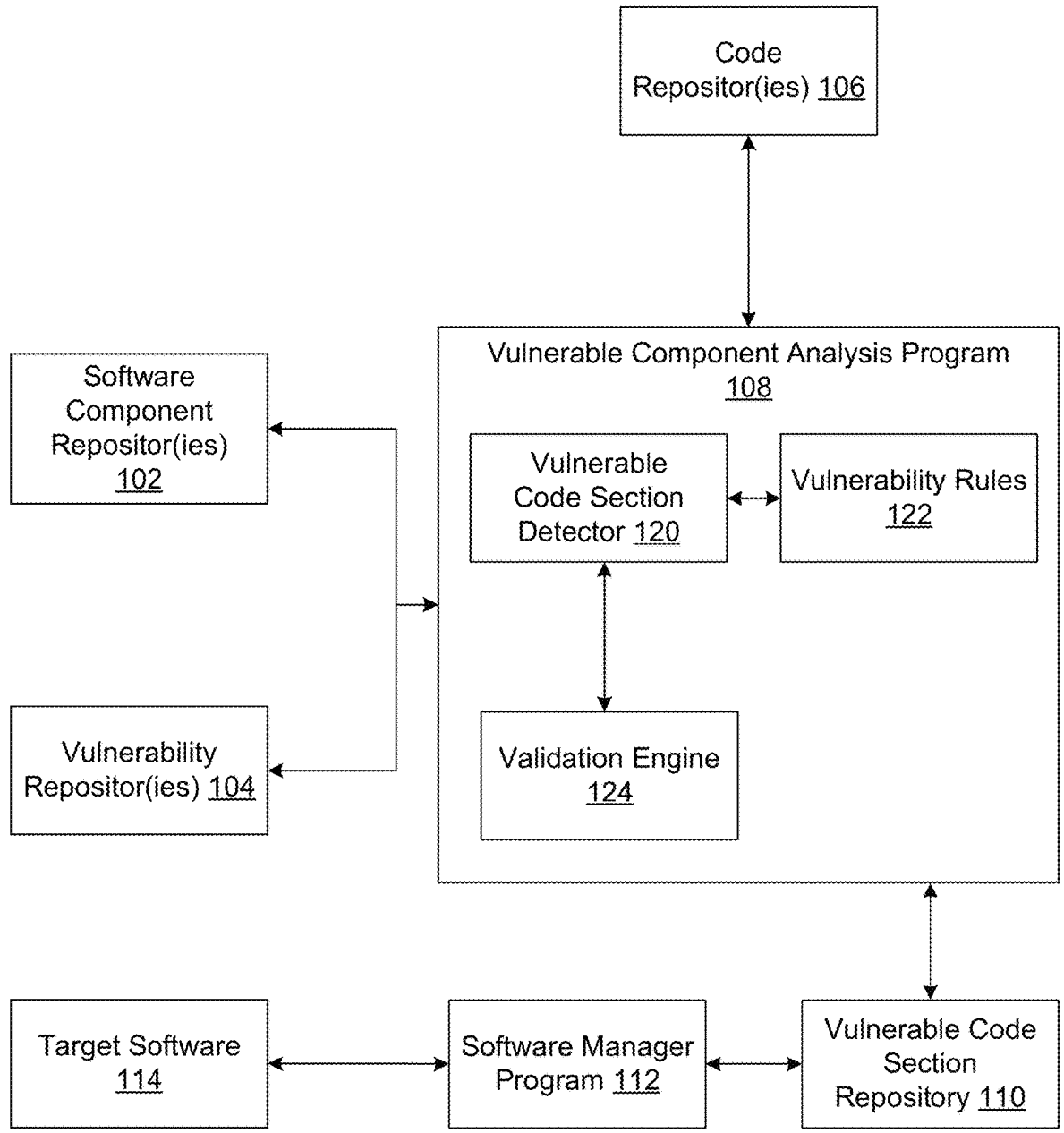
FIG. 1 shows a diagram of a system in accordance with one or more embodiments.

Turning to the Figures, FIG. 1 shows a diagram of a system in accordance with one or more embodiments. As shown in FIG. 1, the system includes component repositor(ies) (102), vulnerability repositor(ies) (104), and code repositor(ies) (106) connected to a vulnerable subcomponent analysis program (108). The vulnerable subcomponent analysis program (108) is connected to a vulnerable code section repository (110) that is used by a software manager program (112). The software manager program (112) is configured to monitor target software (114). Each of these are described below.

The various repositories shown in FIG. 1 are data repositories. A data repository is any type of storage unit and/or device (e.g., a file system, database, data structure, or any other storage mechanism) for storing data. Further, the data repository may include multiple different, potentially heterogeneous, storage units and/or devices. One or more of the data repositories may be third party repositories. Further, the data in the data repository may be third party data, such as data available for public use or purchase.

Component repositor(ies) (102) are one or more repositories having software components. A software component is computer executable instructions that may be incorporated into other software (e.g., target software). A software component may be an application or a software library. For example, a software component may be open source software (OSS). Software components may be composed of a set of code files. A code file is a file having software code. The software code in the code file may be source code and/or executable code. The executable code is a compiled version of the source code. For example, the executable code may be any compiled code or other executable form of software. Within the software code are code sections. A code section is stored in a single code file, whereby the single code file may have one or more code sections. A code section is a compilation unit or other block of code. A code section may be a method or class. Although the terms method and class are used, the term method and class refer to equivalent units of code in other programming languages. For example, a class is any programming language structure that encapsulates code. The code encapsulated by the class is equivalent to a method. A code section may include one or more other code sections in addition to other instructions. The inclusion is complete. Namely, a first code section that is included in a second code section is completely included in the section code section. For example, a code section that is a class includes one or more code sections that are methods.

Vulnerable record repositor(ies) (104) are one or more storage repositories having vulnerability records. A vulnerability record is a record of a vulnerability that is reported as being present in a software component. For example, a vulnerability repository may be in accordance with Common Vulnerabilities and Exposures (CVE) system. CVE is an established system for publicly disclosing vulnerabilities in software products (e.g., applications or libraries). CVE is used by the US National Vulnerability Database (NVD). CVE sets forth a process of uniquely identifying vulnerability and disclosing the vulnerability publicly, usually after the vulnerability is fixed. The disclosure or reporting of the vulnerability includes a standard set of metadata, such as severity. The vulnerability record may be cloned by other public and commercial providers of vulnerability databases, e.g., Github Security Advisories (GHSA). A vulnerability record may include various types of information. For example, the vulnerability record may include the unique identifier, a description of the vulnerability, one or more links to references, and other metadata.

Patches to mitigate or even correct vulnerabilities may be published in one or more code repositor(ies) (106). A patch is a set of instructions that update a software component. A set of patches may be associated with a same vulnerability. For example, different versions of a software component may have different patches. Further, a patch may be a commit, which is an individual, addressable change to the software component. Multiple commits may exist, which are each applicable to the same software component. Thus, a set of patches may include one or more patches.

A code repository (106) is a data repository that has published patches. The code repository may store other code as well as patches. For example, the code repository may be a central repository, or a repository of a company that creates the component. Multiple code repositories may exist. For example, the different code repositories may be associated with different producers of patches and software components.

Continuing with FIG. 1, a vulnerability code section record repository (110) is a record that relates a vulnerability to the particular code sections of the software component that are affected by the vulnerability. In one or more embodiments, the vulnerability repository lists only the code sections that are inferred to have, at least in part, the vulnerability. Code sections of the software component that are unaffected by the vulnerability are excluded from the vulnerable code section record (110). In one or more embodiments, a code section is determined to be vulnerable when the code section is modified by the patch.

Target software (114) is software that is a target for vulnerability analysis based on whether the target software includes software components with code sections that are vulnerable. Specifically, the target software (114) may include one or more software components, or portions thereof, from the component repository. Thus, vulnerabilities in the included software components become, by being included in the target software, vulnerabilities in the target software.

A software manager program (112) is a software program that is configured to analyze the target software (114) and identify vulnerable code sections. The software manager program may be further configured to fix or update the target software based on the vulnerable code sections.

As shown in FIG. 1, a vulnerable subcomponent analysis program (108) may be connected to vulnerable code section repository (110), code repositor(ies) (106), component repositor(ies) (102), and vulnerability repositor(ies) (104). The vulnerability subcomponent analysis program (108) is configured to determine the vulnerable subcomponents of versions of a software component. Specifically, the vulnerable subcomponent analysis program (108) is configured to create the vulnerable code section record with the vulnerable code sections. The vulnerable subcomponent analysis program (108) includes a vulnerable code section detector (120), vulnerability rules (122), and a validation engine (124).

The vulnerable code section detector (120) is configured to infer when a code section is vulnerable based on the vulnerabilities in the vulnerability repositories (104). Specifically, the vulnerable code section detector (120) is software configured to trigger the application of patches and compare versions of the code files before and after applying the patches. In one or more embodiments, the vulnerability repository has hundreds of thousands of vulnerability records, each affecting several versions of software components. The vulnerable code section detector (120) may iterate through the entire vulnerable record repository or a subset thereof to determine the vulnerable code sections for each of the vulnerable records. The subset of the vulnerability records in the vulnerability repository may be the subset having attributes matching predefined criteria. For example, the predefined criteria may be the type of software component (e.g., software library or software application), whether the software component is open source, whether the software component is used or projected to be used by target software, or other criteria.

In one or more embodiments, the vulnerable code section detector (120) may limit the detection of vulnerable code sections based on the age of the vulnerability and/or by a set of artifacts, or versions thereof.

The vulnerability rules (122) are a set of rules that define whether a code section is deemed vulnerable. In some cases, the vulnerability rules define whether a child code section is vulnerable or the entire parent code section that contains the child code section is vulnerable. Conceptually, the vulnerability is inferred to be in the smallest code section (of the code before the change) that contains the change. For example, if a patch adds a child code section to a parent code section, then the child code section is not vulnerable, rather the parent code section is vulnerable. If a patch modifies a child code section in a parent code section, then the child code section is vulnerable, and the parent code section is not vulnerable absent other modifications satisfying other vulnerability rules (122). If a code section is removed, then the code section is determined to be vulnerable. If a modification exists in the instructions of the code section, then the code section is deemed vulnerable. Other vulnerability rules may exist without departing from the scope of the claims. For example, the vulnerability rules may be dictated by the programming language and differ between the programming languages.

A validation engine (124) is configured to validate the versions of the software component that are vulnerable. Specifically, the vulnerability record of a vulnerability includes a list of vulnerable versions of a software component. The validation engine (124) is configured to determine, for a vulnerable version in the list of vulnerable versions, whether the vulnerable version has the set of code sections of the software component that are vulnerable. If the vulnerable version has the set of code sections, then the vulnerable version is validated as having specific vulnerable code sections. Namely, for the particular vulnerable version, the system determines that a more detailed record of the code sections that are vulnerable exist.

Figure 2:
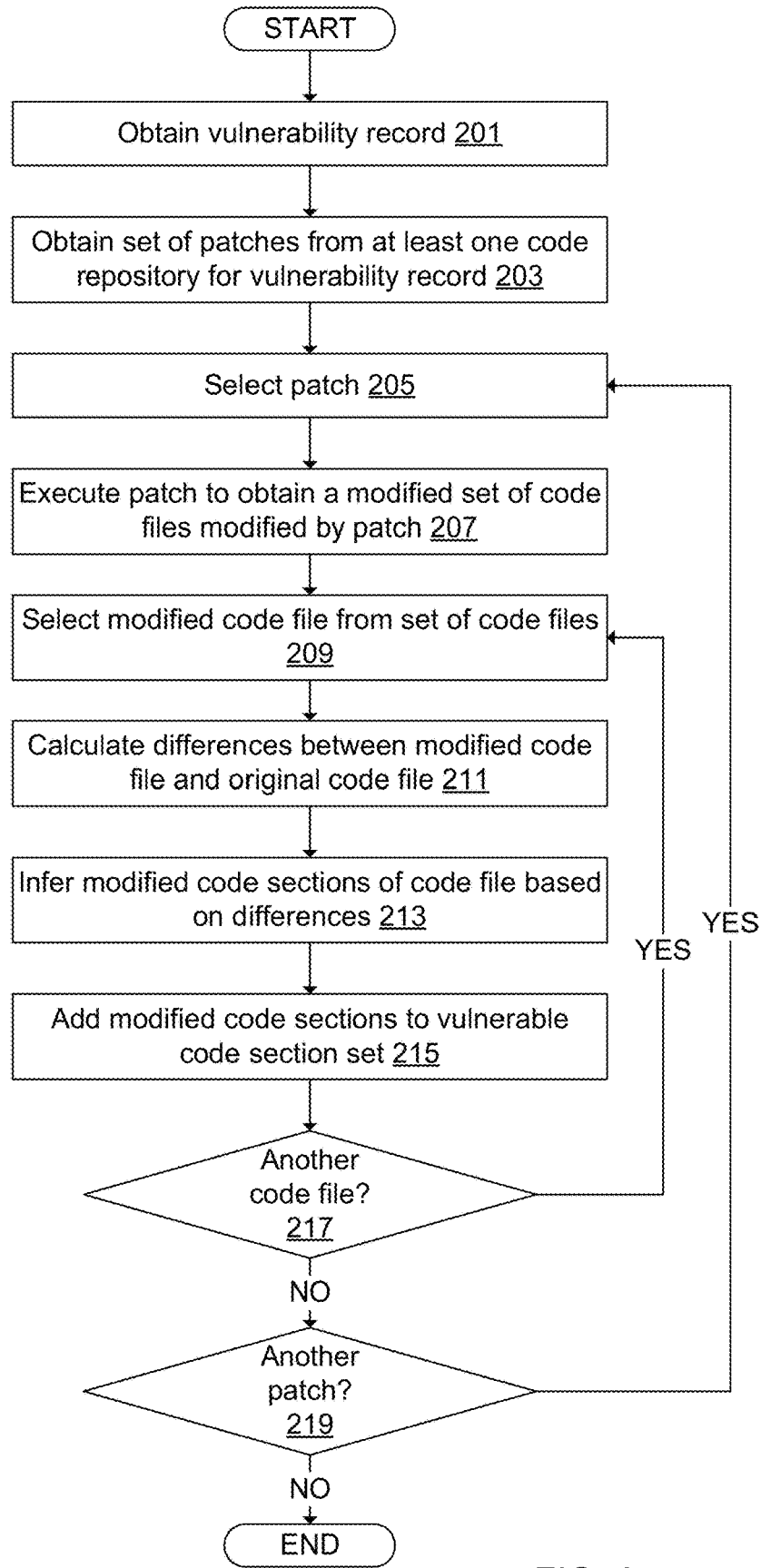
FIG. 2 shows a flowchart for determining code sections affected by a vulnerability in accordance with one or more embodiments.
Figure 3:
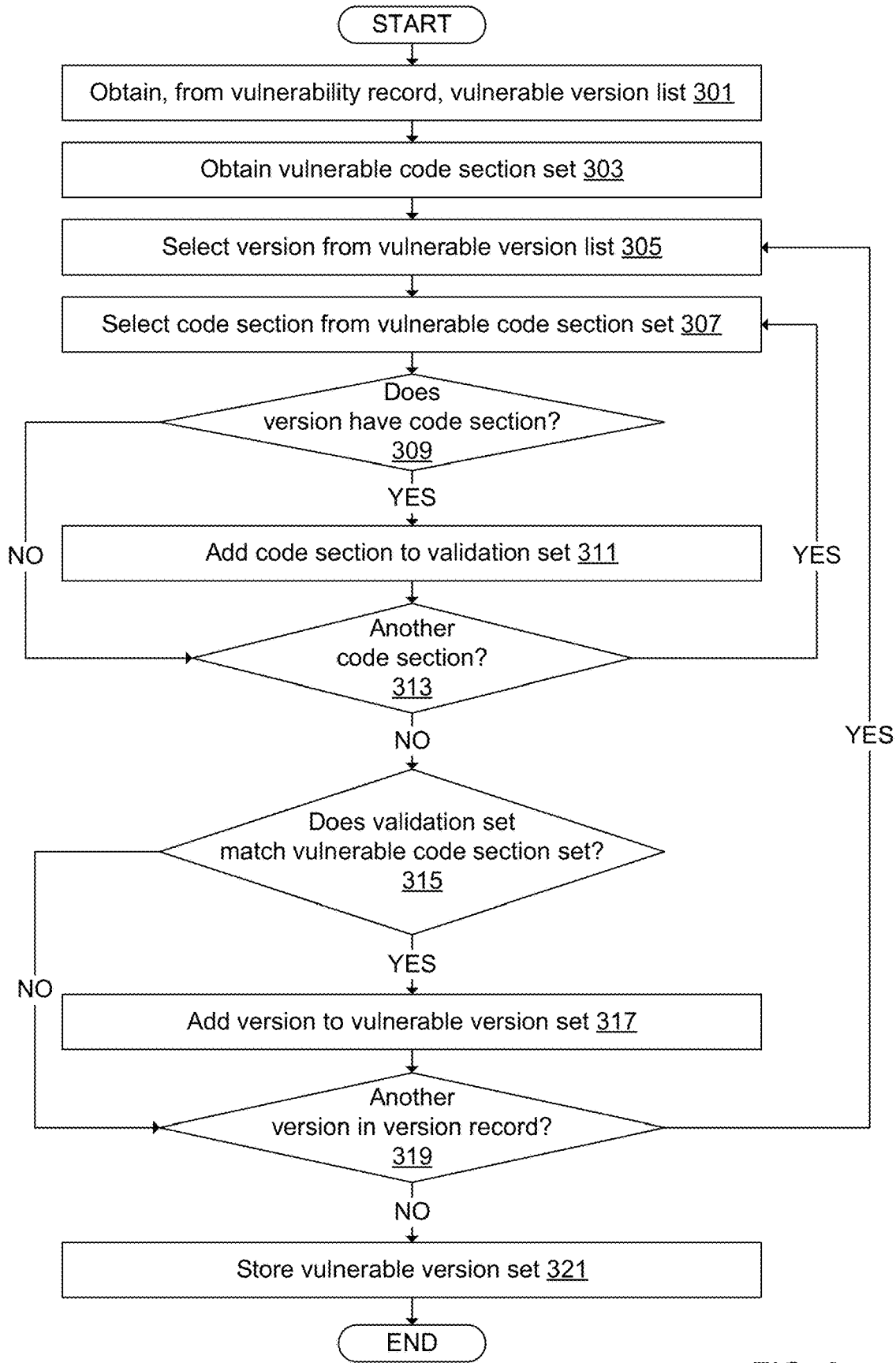
FIG. 3 shows a flowchart for validating versions having a vulnerability in accordance with one or more embodiments.

Processes to determine code sections that are vulnerable and validate vulnerable versions are described in the flowcharts of FIGS. 2 and 3, respectively. Analyzing a target program is described in the flowchart of FIG. 4. While the various steps in these flowcharts are presented and described sequentially, at least some of the steps may be executed in different orders, may be combined or omitted, and at least some of the steps may be executed in parallel. Furthermore, the steps may be performed actively or passively.

Turning to FIG. 2, in block 201, a vulnerability record is obtained. In one or more embodiments, the vulnerable code section detector queries the vulnerability repository for a set of vulnerabilities matching predefined criteria. In some embodiments, the analysis is performed on a per vulnerability group basis. A vulnerability group is a group of vulnerability records that are related based on attributes of the vulnerabilities. For example, the attributes may be the software component having the vulnerability, the type of software component having the vulnerability, the function of the software component having the vulnerability, the type of vulnerability, or other attribute of the vulnerability records. If the vulnerable code section detector operates on a vulnerability group basis, then the vulnerable code section detector queries the vulnerability repository for identifiers of vulnerability records having the attributes of the vulnerability group. The vulnerable code section detector may then iterate through vulnerability records identified in the returned vulnerability group before moving to the next vulnerability group. By grouping the processing of vulnerabilities into vulnerability groups, the processing of the vulnerable subcomponent analysis program may be improved. Further, vulnerable subcomponent analysis program may group vulnerable code section records into the vulnerability groups when storing the records in the vulnerable code section repository.

Regardless of how the vulnerable code section detector selects a vulnerability record, the next vulnerability record is processed. In one or more embodiments, a set of patches are obtained from at least one code repository for the vulnerability record in Block 203. The links to the patches or the set of patches are listed in the vulnerability record. Thus, the vulnerable code section detector follows the link to the patches.

In Block 205, a patch is selected. In one or more embodiments, the vulnerable code section detector iterates through the patches in order.

In Block 207, the patch is applied to an original set of code files to obtain a modified set of code files. The modified set of code files are code files that are modified by the patch. In one or more embodiments, the original and modified set of code files are source code files, which may be obtained from a source code repositor(ies). For example, the source code files may be obtained from an open source repository. When the patch is applied, one or more code sections in the modified set are changed by the patch.

In Block 209, a modified code file is selected from the modified set of code files. The vulnerable code section detector iterates through the modified set of code files to determine changes.

In Block 211, the differences between the modified code file and the original code file are calculated. The vulnerable code section detector performs a comparison of the original code file that is prior to applying the patch in Block 207 and the modified code file that is after applying the patch in Block 207. In one or more embodiments the original set of code files and modified set of code files are translated to a representation to enable efficient and accurate comparison. As an example, abstract syntax trees may be created from the sets of files.

In Block 213, the modified code sections of the code file are inferred based on the differences. The vulnerability rules are applied to the differences to determine which code sections are vulnerable. Namely, the inference is because the fact that a code section is modified does not necessarily mean that the code section has the vulnerability. The patch may modify the code section for other purposes. Further, the vulnerability rules specify when a child code section is deemed vulnerable as compared to when a parent code section is deemed vulnerable.

In Block 215, the modified code section is added to the vulnerable code section set. If a modified code section is inferred as being vulnerable, the modified code section is added to the vulnerable code section set.

In Block 217, a determination is made whether another unprocessed modified code file exists in the modified set of code files. The inferring as to which code sections are modified is repeated for each modified code file in the set of modified code files. If another modified code file exists, the process is repeated for the unprocessed modified code files starting with Block 209.

In Block 219, a determination is made whether another patch exists. Each patch for the vulnerability is applied to the software component. If another patch exists, the flow returns to Block 205. Although FIG. 2 shows the patches being applied while determining the modifications made by the respective patches, each of the patches affected by the vulnerability may be applied prior to inferring vulnerable code sections.

After applying FIG. 2, a vulnerable code section set is generated for the vulnerability. Vulnerable code sections in the vulnerable code section set may be merged prior to storage in the vulnerable code section repository. The merging removes redundancies (e.g., code sections listed more than once are listed once). Further, if a child code section of a parent code section is listed along with the parent code section, then the child code section is removed and the parent code section is listed. After merging, the vulnerable code section set is stored.

The processing of FIG. 2 is performed for the version of the software identified by patches in the vulnerability record. The vulnerable code section set may initially be assumed to be applicable to all versions in the vulnerability record. The patch implies the version by referring to the source code in before compilation. However, the source code before compilation may not align with any released version of the compiled software component. Namely, the distributed version of the software component may be a compiled version, which may or may not be compiled from the source code that is analyzed in FIG. 2. Validation of FIG. 3 may be used to find the subset of vulnerable versions in the vulnerability record for which the patch-inferred code section information holds.

FIG. 3 shows a validation procedure. In Block 301, from the vulnerability record, a vulnerable version list is obtained. One of the attributes of the vulnerability record is a list of versions that are reported as having the vulnerability. The list may be an approximation. For example, the list may be over inclusive.

In Block 303, the vulnerable code section set for the vulnerability is obtained from the vulnerable code section repository based on the vulnerability identifier of the vulnerability in the vulnerability record.

In Block 305, a version is selected from the vulnerable version list. In one or more embodiments, the compiled versions of the software component is used in the validation. Namely, the version may correspond to a set of compiled code files. However, the vulnerable code section set refers to the code sections in the source code. To handle the difference between compiled and source code, a mapping is used. The mapping may be based on the lowering of source code and/or alternatively the lifting of compiled code. In one or more embodiments, the lowering or lifting is limited to code section signatures and types. For example, the lifting or lowering may be limited to types (i.e., primitive and classes), and method's signatures.

Further, a code section is selected from the vulnerable code section set in Block 307. A determination is made whether the selected version in Block 305 has the code section in Block 309. If the selected version has the code section, then the code section is added to a validation set in Block 311. Specifically, an identifier of the code section is added to the validation set. In Block 313, a determination is made whether another code section exists in the vulnerable code section set. If another code section exists in the vulnerable code section set, the flow proceeds to the next code section in Block 307. Thus, the process of Blocks 307-313 is to determine the vulnerable code sections that are in the version identified in Block 305. The vulnerable code sections are identified in a validation set for the version and vulnerability.

In Block 315, a determination is made whether the validation set matches the vulnerable version code section set. The match may be a complete match (e.g., all vulnerable code sections are in the validation set). As another example, the match may be that a threshold number of code sections are identified in both sets. Using a threshold allows for some code sections to not be present in both sets. Because the validation set is a subset of the vulnerable code section set, the determination in Block 315 may be whether difference in the number of code sections satisfies a threshold.

If the validation set matches the vulnerable code section set in Block 315, the version is added to the validated version set in Block 317. The vulnerable version set is the set of versions of the software component that are deemed vulnerable by the vulnerability.

Further, a determination is made whether another version exists in the version list in Block 319. If another version exists, the flow returns to Block 305 to select the next version.

Continuing with FIG. 3, in Block 321 a vulnerable version set is stored. The vulnerable version set is stored with the vulnerability identifier and the vulnerable code section set in the vulnerable code section repository.

The processing of FIGS. 2 and 3 is performed repeatedly for the vulnerability repository. Further, the processing of FIGS. 2 and 3 is performed across vulnerability repository. Because, in part, of the number of vulnerability records and versions of components, the processing cannot be performed by a human. Further, validation is a procedure where (large amounts of) compiled code is processed and the lowering/lifting translation is applied. These specifically qualify as something a human cannot perform. One or more embodiments use the vulnerable code section set to provide a more granular analysis of target software.

Figure 4:
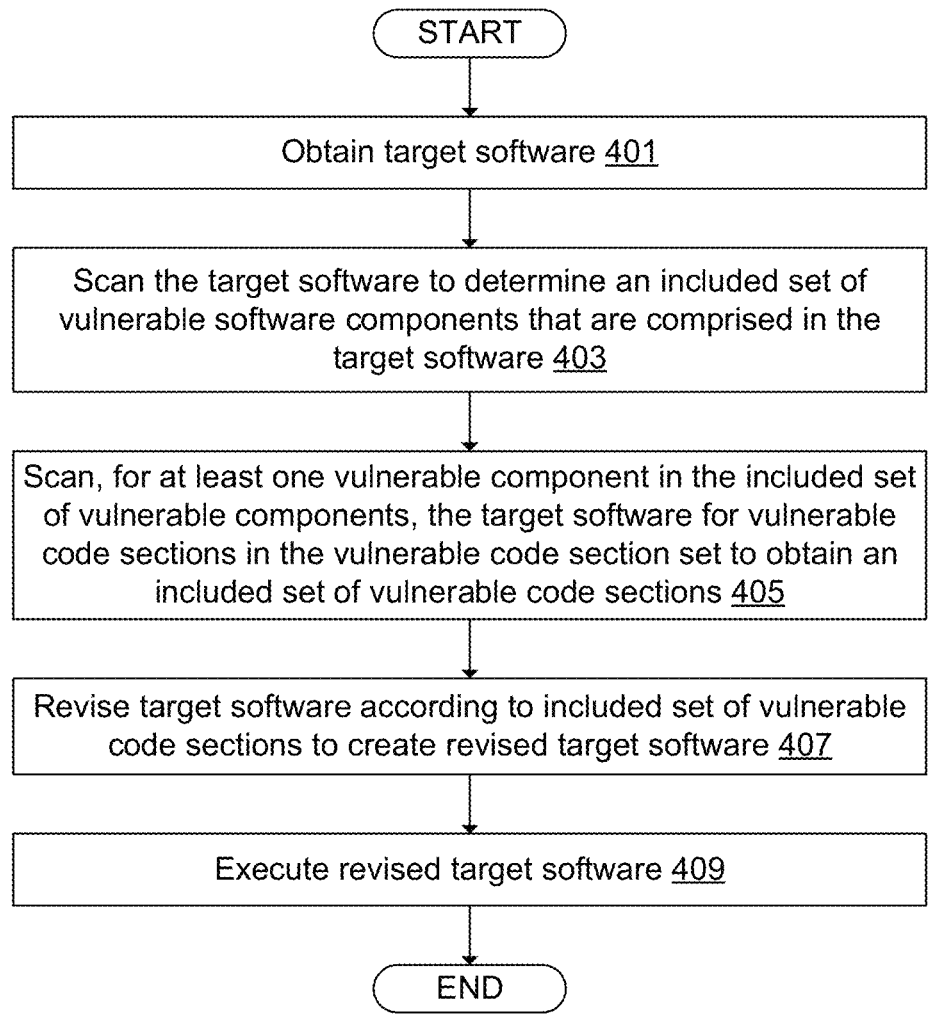
FIG. 4 shows a flowchart for updating target software in accordance with one or more embodiments.

FIG. 4 shows a flowchart for analyzing target software in one or more embodiments. When target software uses software components that have vulnerabilities, the target software itself is vulnerable. Thus, the target software has security risks. However, because of the number of vulnerabilities in large software products, over inclusion of vulnerabilities may cause actual vulnerabilities to not be corrected. Thus, a more accurate and granular list of vulnerabilities is desirable. The analysis in FIG. 4 provides for a more accurate list of vulnerabilities in target software.

Turning to FIG. 4, in Block 401, the target software is obtained. For example, the software manager program may operate to perform a vulnerability analysis on target software.

In Block 403, the target software is scanned to determine an included set of vulnerable components that are comprised in the target software. In one or more embodiments, the target software includes metadata that identifies the software components, with corresponding version information identifying the respective versions of the software components, which are used by the target software. For each software component, the vulnerability repository is searched with the version and the software component identification information to obtain the vulnerability records of the included software component. The process is repeated for each software component used by the target software. The result of Block 403 is a set of vulnerability records related to the target software. The set of vulnerability records may be a list of vulnerable record identifiers with corresponding software component identifiers, and version information.

In Block 405, for at least one vulnerable component in the included set of vulnerable components, the target software is scanned for vulnerable code sections in the vulnerable code section set to obtain an included set of vulnerable code sections. For a vulnerable component, the vulnerable code section repository is queried with the vulnerable record identifiers and version information to obtain one or more vulnerable code section sets. For each vulnerable code section in a vulnerable code section set, a determination is made whether the vulnerable code section is present in the target software. The determination may be based on the compiled or the source version of the target software. If the vulnerable code section is present, then the vulnerable code section is added to an included set of vulnerable code sections. The process is repeated for each vulnerable software component in the included set of vulnerable software components. The result of Block 405 is a more detailed view of the vulnerabilities of software components included in the target software. The vulnerabilities may be presented and stored at different levels of a hierarchy. At a first level, the software component is listed. At the second level, the vulnerable record identifier is listed for the corresponding software component. At the third level, the included set of code sections is listed for the corresponding vulnerable record identifier. Based on the analysis of Block 405, one or more of the vulnerable software components that are determined to be in the included set in Block 403 are subsequently excluded in Block 405. Specifically, if the target software does not include any vulnerable code section of any vulnerability of the software component, the software component is excluded and deemed not to be vulnerable. Thus, no action needs to be taken to correct a vulnerability.

In Block 407, the target software is revised according to the included set of vulnerable code sections to create revised target software. Patches may be applied to the software components used by the target software to revise the target software. Applying the patches may require further modification to the target software itself. Because embodiments limit the list of vulnerabilities in software components to only the software components used by the target software, the number of modifications may be greatly reduced. In the absence of code section level information for a vulnerability or component, the component itself may be patched.

In Block 409, the revised target software is executed in one or more embodiments. Specifically, a processor executes the revised target software.

Figure 5:
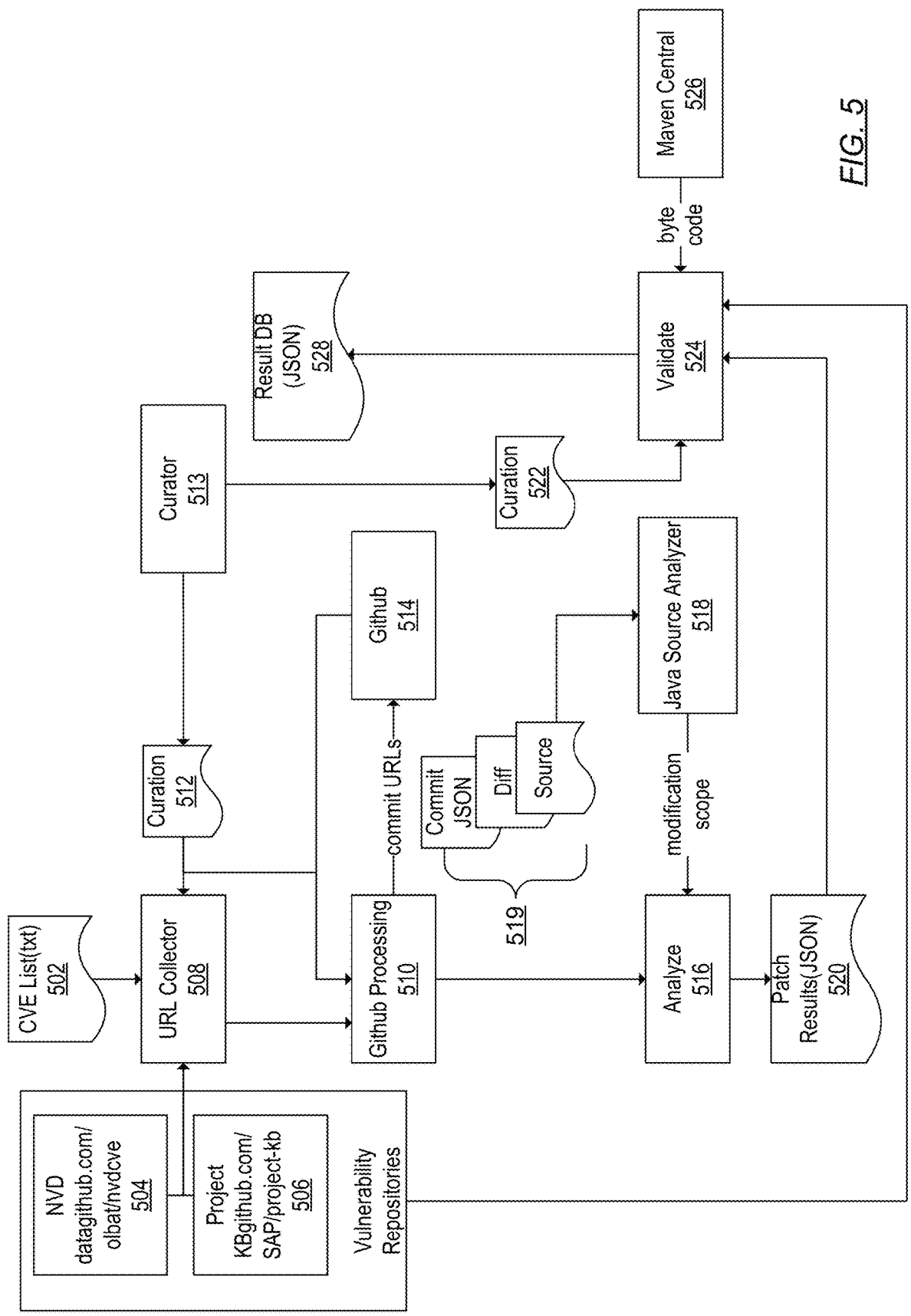
FIG. 5 shows an example flow diagram to generate a vulnerable code section record in accordance with one or more embodiments.
Figure 6:
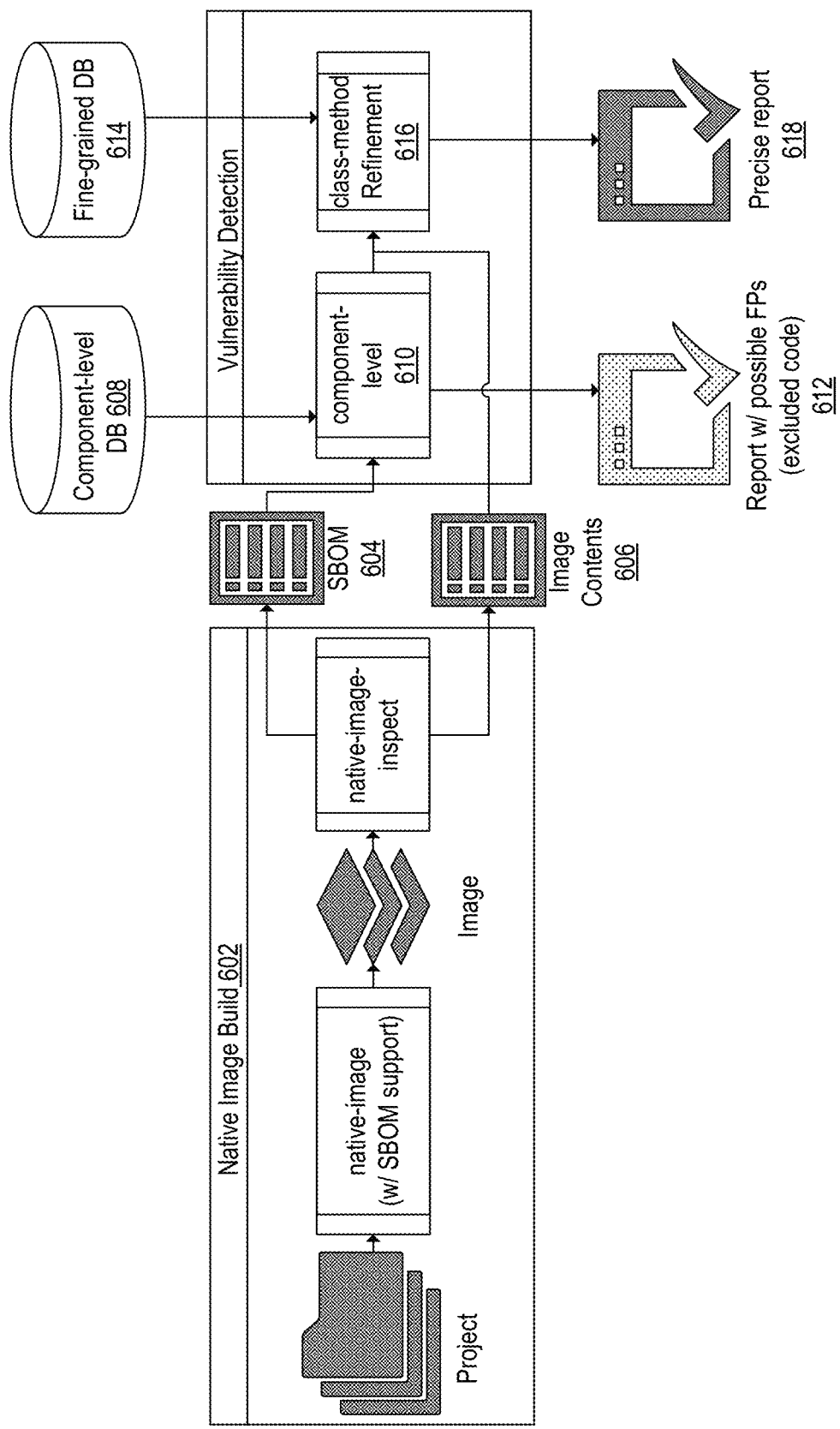
FIG. 6 shows an example flow diagram to analyze target software in accordance with one or more embodiments.

FIGS. 5 and 6 show examples for implementing one or more embodiments when the software components are libraries, and the vulnerable code sections are methods and classes. FIG. 5 shows an example flow diagram to generate a vulnerable code section record in accordance with one or more embodiments. Turning to FIG. 5, a uniform resource locator (URL) collector (508) may obtain vulnerability records and patch URLs from a CVE list (502), source code for one or more software libraries from source knowledgebases (504, 506). A curator (513) may revise information derived from vulnerability records and patch URLs in curation (512, 522). With curation (512), Github processing (510) may be performed to download the patches from the Github (514) using the patch URLs.

The resulting information is analyzed (516) to perform the vulnerable code section analysis. Specifically, the vulnerable code section analysis employs a analyzer (518) that operates on the various files (519) to determine vulnerable code sections (520). With curation (522), validation (524) is performed using the source knowledgebase and information and software packages in a central repository (526). The result may be stored in a class method knowledgebase (KB) (528).

FIG. 6 shows an example flow diagram to analyze target software in accordance with one or more embodiments. In FIG. 6, a native image build (602) has a project with several project files which are compiled into image files. The native image build is related to a software bill of materials (SBOM) (604) that list the software components used by the target software of the native image build (602) as well as image contents (606) of the images, which contain information about code sections. The SBOM (604) is used in conjunction with the vulnerability repository (608) to perform an component level analysis (610) and obtain a report of known component versions (612) used by the native image build having vulnerabilities. The fine-grained vulnerability knowledgebase (614) is used to perform a class method refinement (616) by removing those software components that do not have vulnerable class or method code sections used by the native image build. The result is a more precise report (618). Because the report is more precise, only the revisions that are actually needed are performed.

One or more embodiments are applicable to monolithic systems. Specifically, with the CVE repository, users may identify vulnerable software under the user's control and act accordingly, which commonly involves estimating impact, mitigating the vulnerability, and by eventually resolving the vulnerability by (1) applying patches or by (2) upgrading to a newer version. While (1) is still common with large monolithic systems, (2) is more prevalent in modern compositional software development, where an application (or library) uses functionality of (and thus depends on) a set of software libraries. Thus, especially for (2), tracking the versions of software dependencies is important, and disclosure of a given vulnerability relies on (ranges of) versions to accurately communicate which releases of a software product are vulnerable and which ones are not. While versions are most important, for open-source software (OSS), the code change fixing the vulnerability is usually known and published at the same time to provide context. Because in some cases, only a subset of the functionality of an application or library are vulnerable, the fixed code can be helpful to establish a bound on that subset, and whether users of the application or library are vulnerable in turn. In general, knowing more about vulnerable code of a software product means knowing more about the vulnerability's impact. One or more embodiments may be used to locate known vulnerabilities in open source code in order to more accurately detect potentially vulnerable code at compile time and runtime.

Figure 7A:
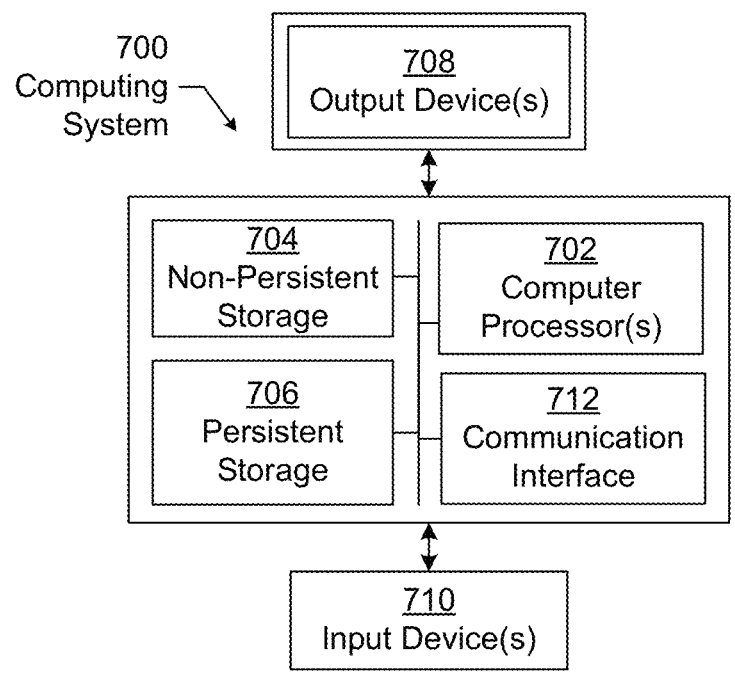
FIGS. 7A and 7B shows a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (712). The inputs may include text input, audio input, video input, etc., which may be processed and transmitted by the computing system (700) in accordance with the disclosure. The communication interface (708) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (712) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 7B:
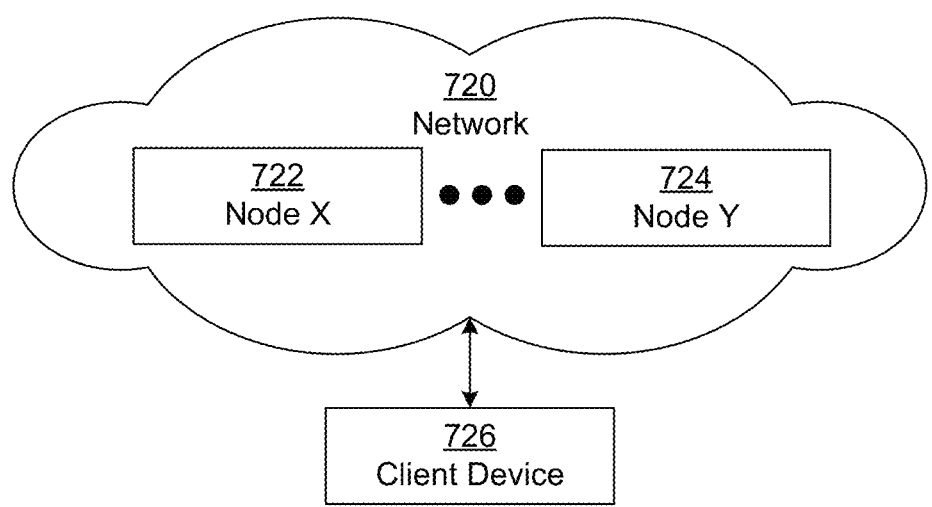

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another networking component or network). A connection may be wired or wireless. A connection may be temporary, permanent, or semi-permanent communication channel between two entities.

The various descriptions of the figures may be combined and may include or be included within the features described in the other figures of the application. The various elements, systems, items, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    obtaining a set of patches from at least one code repository for a vulnerability record of a vulnerability of a software component;
    applying the set of patches to obtain a modified set of code files modified by the set of patches;
    inferring a vulnerable code section set according to the modified set of code files, wherein the vulnerable code section set is a subset of the modified set of code files;
    obtaining a vulnerable version list of a plurality of versions of the software component comprising the vulnerability;
    validating a version in the vulnerable version list as having the vulnerable code section set; and
    processing a target software comprising the version using the vulnerable code section set.

2. The method of claim 1, further comprising:
    calculating, for a modified code file, at least one difference between code sections in corresponding original set of code files and code sections in the modified set of code files; and
    inferring at least one modified code section based on a comparison of the at least one difference with a plurality of vulnerability rules.

3. The method of claim 2, wherein the plurality of vulnerability rules specify that a programming language structure is a vulnerable code section when the at least one difference comprises the programming language structure being at least one selected from a group consisting of the programming language structure being removed and the programming language structure being added, wherein the programming language structure encapsulates code.

4. The method of claim 2, wherein the plurality of vulnerability rules specify that the programming language structure is a vulnerable code section when the at least one difference comprises code encapsulated in the programming language structure is being added.

5. The method of claim 2, wherein the plurality of vulnerability rules specifies that a programming language structure being added to the software component according to at least one difference fails to trigger adding the programming language structure to the vulnerable code section set, wherein the programming language structure encapsulates code.

6. The method of claim 1, wherein the vulnerable code section set comprises an identifier of a code section that is at least one of an individual class and an individual method in the software component.

7. The method of claim 1, wherein processing the target software comprises:
    scanning the target software to determine an included set of vulnerable software components that are comprised in the target software;
    scanning, for at least one vulnerable software component in the included set of vulnerable software components, the target software for vulnerable code sections in the vulnerable code section set to obtain an included set of vulnerable code sections; and
    revising the target software according to the included set of vulnerable code sections to generate revised target software.

8. The method of claim 7, further comprising:
    executing the revised target software.

9. The method of claim 1, further comprising:
    grouping a plurality of vulnerability records into a vulnerability group based on a commonality of a type of vulnerability.

10. The method of claim 1, further comprising:
    lifting the version of the software component to obtain code sections in a lifted version,
    wherein the validating is performed using the lifted version.

11. The method of claim 1, further comprising:
    calculating at least one difference between code sections in compiled code before and after applying the set of patches,
    wherein inferring the vulnerable code section set is performed using the at least one difference.

12. A system comprising:
    a data repository storing a vulnerable code section record; and
    at least one processor for executing instructions for performing operations comprising:
        obtaining a set of patches from at least one code repository for a vulnerability record of a vulnerability of a software component,
        applying the set of patches to obtain a modified set of code files modified by the set of patches,
        inferring a vulnerable code section set according to the modified set of code files, wherein the vulnerable code section set is a subset of the modified set of code files,
        obtaining a vulnerable version list of a plurality of versions of the software component comprising the vulnerability,
        validating a version in the vulnerable version list as having the vulnerable code section set,
        storing the vulnerable code section set in the vulnerable code section record, and
        processing a target software comprising the version using the vulnerable code section record.

13. The system of claim 12, wherein the operations further comprise:
  calculating, for a modified code file, at least one difference between code sections in corresponding original set of code files and code sections in the modified set of code files; and
  inferring at least one modified code section based on a comparison of the at least one difference with a plurality of vulnerability rules.

14. The system of claim 13, wherein the plurality of vulnerability rules specify that a programming language structure is a vulnerable code section when the at least one difference comprises the programming language structure being at least one selected from a group consisting of the programming language structure being removed and the programming language structure being added, wherein the programming language structure encapsulates code.

15. The system of claim 13, wherein the plurality of vulnerability rules specify that the programming language structure is a vulnerable code section when the at least one difference comprises code encapsulated in the programming language structure is being added.

16. The system of claim 13, wherein the plurality of vulnerability rules specifies that a programming language structure being added to the software component according to at least one difference fails to trigger adding the programming language structure to the vulnerable code section set, wherein the programming language structure encapsulates code.

17. The system of claim 12, wherein the vulnerable code section set comprises an identifier of a code section that is at least one of an individual class and an individual method in the software component.

18. The system of claim 12, wherein processing the target software comprises:
  scanning the target software to determine an included set of vulnerable software components that are comprised in the target software;
  scanning, for at least one vulnerable software component in the included set of vulnerable software components, the target software for vulnerable code sections in the vulnerable code section set to obtain an included set of vulnerable code sections; and
  revising the target software according to the included set of vulnerable code sections to generate revised target software.

19. A non-transitory computer readable medium comprising computer readable program code for performing operations comprising:
  obtaining a set of patches from at least one code repository for a vulnerability record of a vulnerability of a software component;
  applying the set of patches to obtain a modified set of code files modified by the set of patches;
  inferring a vulnerable code section set according to the modified set of code files, wherein the vulnerable code section set is a subset of the modified set of code files;
  obtaining a vulnerable version list of a plurality of versions of the software component comprising the vulnerability;
  validating a version in the vulnerable version list as having the vulnerable code section set; and
  processing a target software comprising the version using the vulnerable code section set.

20. The non-transitory computer readable medium of claim 19, wherein the operations further comprise:
  calculating, for a modified code file, at least one difference between code sections in corresponding original set of code files and code sections in the modified set of code files; and
  inferring at least one modified code section based on a comparison of the at least one difference with a plurality of vulnerability rules.

* * * * *